(12) United States Patent
Kim et al.

(10) Patent No.: US 12,242,306 B2
(45) Date of Patent: Mar. 4, 2025

(54) DISPLAY MODULE INCLUDING COVER MEMBER

(71) Applicant: Samsung Display Co., Ltd., Yongin-si (KR)

(72) Inventors: Yunjae Kim, Cheonan-si (KR); Joonhyuk Jang, Seoul (KR); Munsik Ham, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 18/159,520

(22) Filed: Jan. 25, 2023

(65) Prior Publication Data

US 2023/0259172 A1 Aug. 17, 2023

(30) Foreign Application Priority Data

Feb. 16, 2022 (KR) .......................... 10-2022-0020038

(51) Int. Cl.
*G06F 1/16* (2006.01)
(52) U.S. Cl.
CPC .......... *G06F 1/1656* (2013.01); *G06F 1/1616* (2013.01); *G06F 1/1652* (2013.01)
(58) Field of Classification Search
CPC .... G06F 1/1656; G06F 1/1616; G06F 1/1652; G06F 1/1637; G06F 1/1641; Y02E 10/549; G09F 9/301; G02F 1/133314; G02F 1/133305; G02F 1/133331
See application file for complete search history.

(56) References Cited

U.S. PATENT DOCUMENTS

| | | | | |
|---|---|---|---|---|
| 11,557,230 | B2* | 1/2023 | Kim | G06F 1/1616 |
| 11,690,204 | B2* | 6/2023 | Xiao | H05K 7/20963 |
| | | | | 361/690 |
| 12,087,185 | B2* | 9/2024 | Ha | H04M 1/0214 |
| 2022/0058990 | A1* | 2/2022 | Yoo | H10K 71/00 |
| 2023/0259172 | A1* | 8/2023 | Kim | G06F 1/1652 |
| | | | | 361/679.01 |
| 2024/0221544 | A1* | 7/2024 | Cho | G06F 1/1641 |

FOREIGN PATENT DOCUMENTS

KR 10-2017-0107141 A 9/2017

* cited by examiner

*Primary Examiner* — Lisa Lea-Edmonds
(74) *Attorney, Agent, or Firm* — Womble Bond Dickinson (US) LLP

(57) ABSTRACT

A display module includes: a display unit to be folded along a virtual folding axis, and including: a front surface; and a rear surface opposite to the front surface; a protection cover on the front surface of the display unit; a cover member on the rear surface of the display unit, and including a cutting part to be separable from the cover member and overlapping with a portion of the folding axis; and a cover pad below the cover member.

20 Claims, 16 Drawing Sheets

DISPLAY MODULE INCLUDING COVER MEMBER

CROSS-REFERENCE TO RELATED APPLICATIONS

This application claims priority to and the benefit of Korean Patent Application No. 10-2022-0020038, filed on Feb. 16, 2022, the entire content of which is hereby incorporated by reference herein.

BACKGROUND

1. Field

One or more embodiments of the present disclosure relate to a display module including a cover member.

2. Description of the Related Art

In general, a display device includes a display module for displaying an image, and a support part for supporting the display module. The display module includes a display unit for displaying an image, a window disposed on the display unit to protect the display unit from external scratches or impacts, and a cover layer disposed below the display unit to protect the display unit from external impacts. The support part has a strength greater than that of the display module to support the display module. As technology of the display device is developed, a display device including a flexible display module is being developed.

The above information disclosed in this Background section is for enhancement of understanding of the background of the present disclosure, and therefore, it may contain information that does not constitute prior art.

SUMMARY

One or more embodiments of the present disclosure may be directed to a cover member including a liner having a cutting line.

One or more embodiments of the present disclosure may be directed to a display module including a cover member having reduced manufacturing costs.

According to one or more embodiments of the present disclosure, a display module includes: a display unit configured to be folded along a virtual folding axis, and including: a front surface; and a rear surface opposite to the front surface; a protection cover on the front surface of the display unit; a cover member on the rear surface of the display unit, and including a cutting part configured to be separable from the cover member and overlapping with a portion of the folding axis; and a cover pad below the cover member.

In an embodiment, the cover member may include: a first liner adjacent to the display unit; a first adhesive layer between the display unit and the first liner; a second liner including an adhesive part adjacent to the cover pad, and overlapping with the cutting part; and a second adhesive layer between the first liner and the second liner. The cover pad may be attached with the cutting part by the adhesive part.

In an embodiment, the display unit may include: a folding area overlapping with the folding axis; and first and second non-folding areas spaced from each other with the folding area therebetween. The cover member may include: a first portion overlapping with a portion of the folding area and the first non-folding area; and a second portion overlapping with a remaining portion of the folding area and the second non-folding area.

In an embodiment, the first portion and the second portion may be connected to each other with the cutting part therebetween in the folding area.

In an embodiment, the first adhesive layer may include urethane, and the second adhesive layer may include silicon.

In an embodiment, when the cutting part is separated from the cover member, the cover pad may be separated together with the cutting part from the cover member.

In an embodiment, when the cutting part is separated from the cover member, a portion of the rear surface of the display unit or a portion of a rear surface of the first liner may be exposed.

In an embodiment, the first liner may be located on a front surface of the second liner, and a portion of the front surface of the second liner may be configured to receive a release treatment to separate the protection cover from the display unit.

In an embodiment, the display module may further include a tape that surrounds at least a portion of the display unit, and attaches the protection cover to the front surface of the second liner.

In an embodiment, the cutting part may further include a handle part that may not overlap with the display unit in a plan view, and may be located at the same layer as that of the second liner.

In an embodiment, the first liner may have a thickness of about 20 μm or more, and about 200 μm or less; and the second liner may have a thickness of about 50 μm or more, and about 100 μm or less.

In an embodiment, when the cutting part is separated from the cover member, a portion of the rear surface of the display unit overlapping with the folding axis with the cutting part therebetween may be covered by the cover member, and a portion of the rear surface of the cover member overlapping with the cutting part may be exposed.

In an embodiment, the display unit may include: a bending part configured to be bent in a direction toward the rear surface of the display unit; and a non-bending part adjacent to the bending part, and overlapping with the folding axis, and the bending part may be exposed from the cover member.

According to one or more embodiments of the present disclosure, a display module includes: a display unit configured to be folded along a virtual folding axis, and including: a front surface; and a rear surface opposite to the front surface; a protection cover on the front surface of the display unit; a cover member including: a first liner on the rear surface of the display unit; and a second liner below the first liner; and a cover pad below the second liner. The cover member further includes a cutting line passing through the first liner and the second liner, and overlapping with a portion of the folding axis.

In an embodiment, the cover member may include an adhesive part on a rear surface of the second liner, at least a portion of the adhesive part being surrounded by the cutting line, and the cover pad may be attached with the second liner by the adhesive part.

In an embodiment, when the first liner and the second liner are removed along the cutting line, a portion of the rear surface of the display unit may be exposed.

In an embodiment, the first liner may be located on a front surface of the second liner, and a portion of the front surface of the second liner may be configured to receive a release treatment to separate the protection cover from the display unit.

In an embodiment, the display module may further include a tape that surrounds at least a portion of the display unit, and attaches the protection cover to the front surface of the second liner.

In an embodiment, the display unit may include: a bending part configured to be bent in a direction toward the rear surface of the display unit; and a non-bending part adjacent to the bending part, and overlapping with the folding axis, and the bending part may be exposed from the cover member.

In an embodiment, at least one of the first liner or the second liner may include: a first portion overlapping with one side of the display unit; and a second portion overlapping with another side of the display unit based on the folding axis, and the first portion and the second portion may be connected to each other.

BRIEF DESCRIPTION OF THE FIGURES

The above and other aspects and features of the present disclosure will be more clearly understood from the following detailed description of the illustrative, non-limiting embodiments with reference to the accompanying drawings. In the drawings.

DETAILED DESCRIPTION

Figure 1:
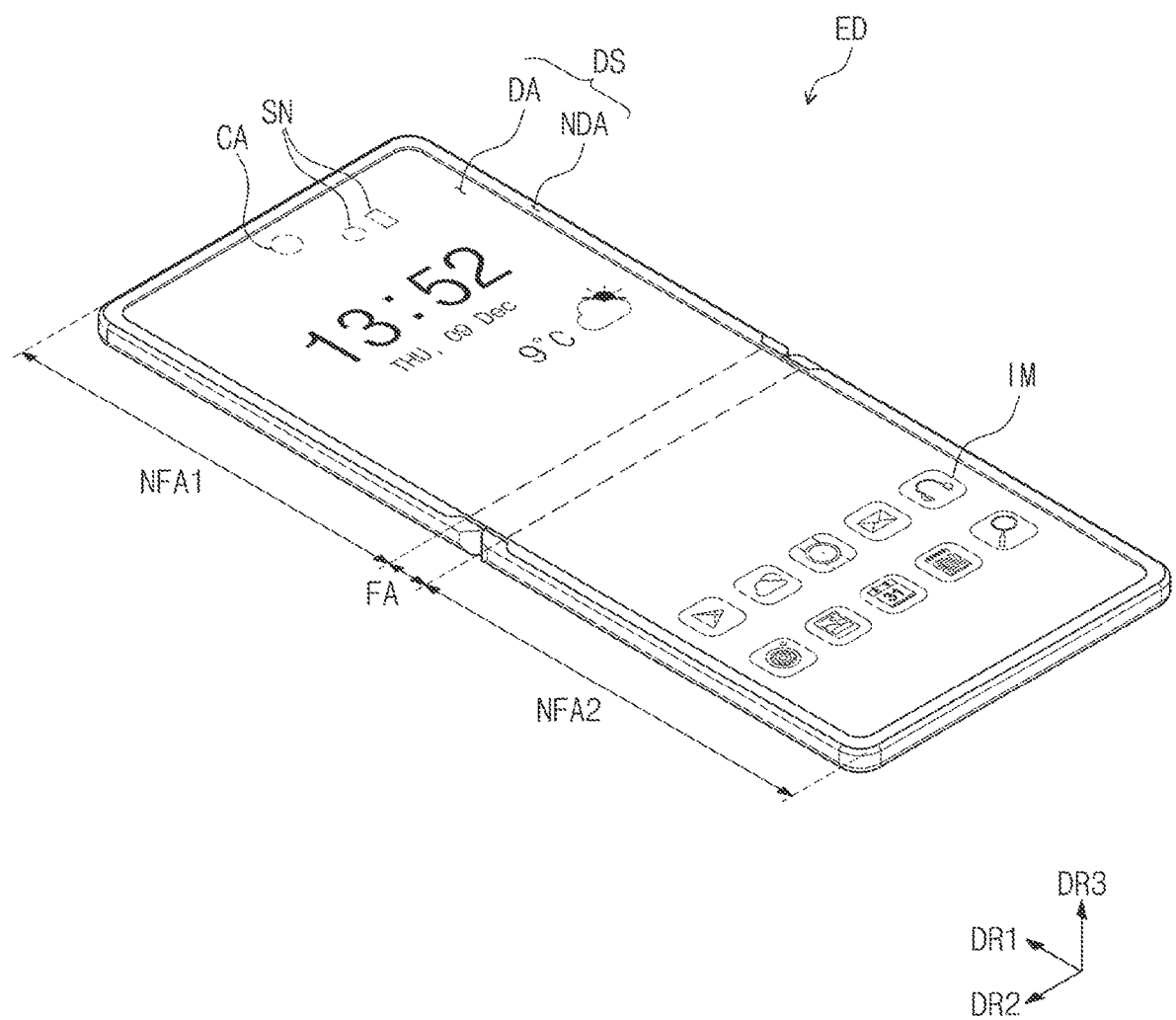
FIG. 1 is a perspective view illustrating an unfolded state of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
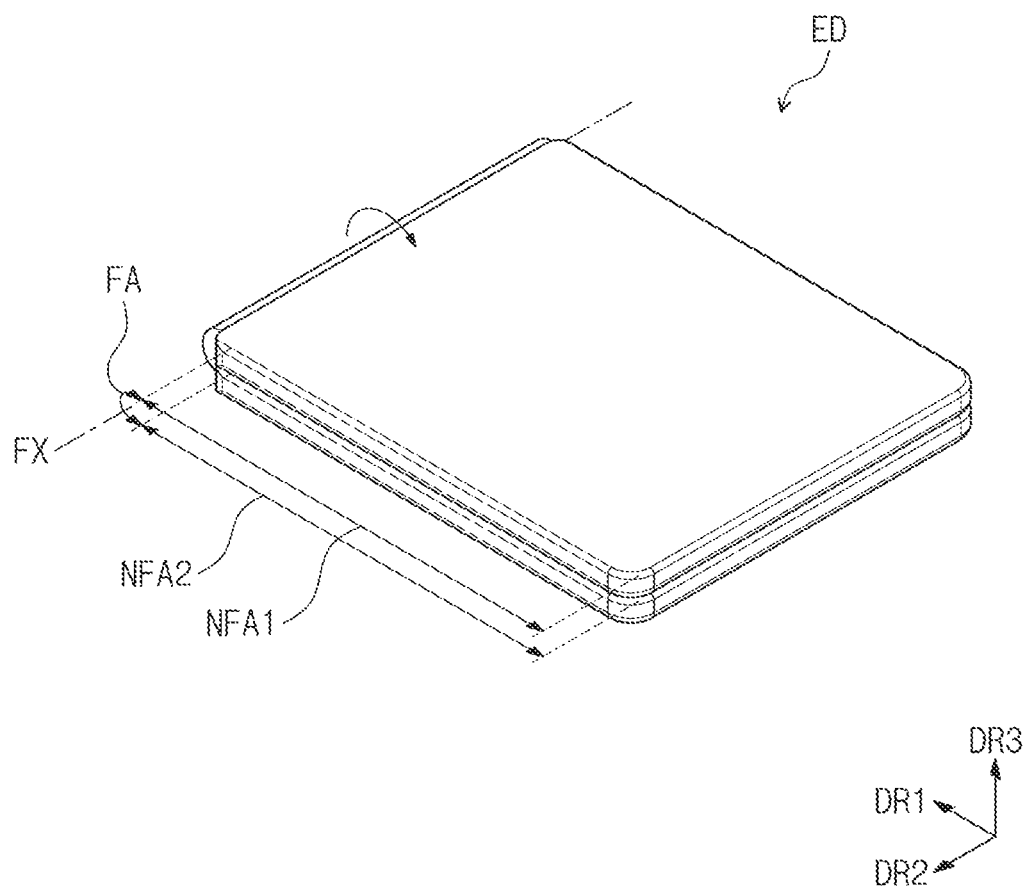
FIG. 2 is a perspective view illustrating a folded state of the display device according to an embodiment of the present disclosure.
Figure 3:
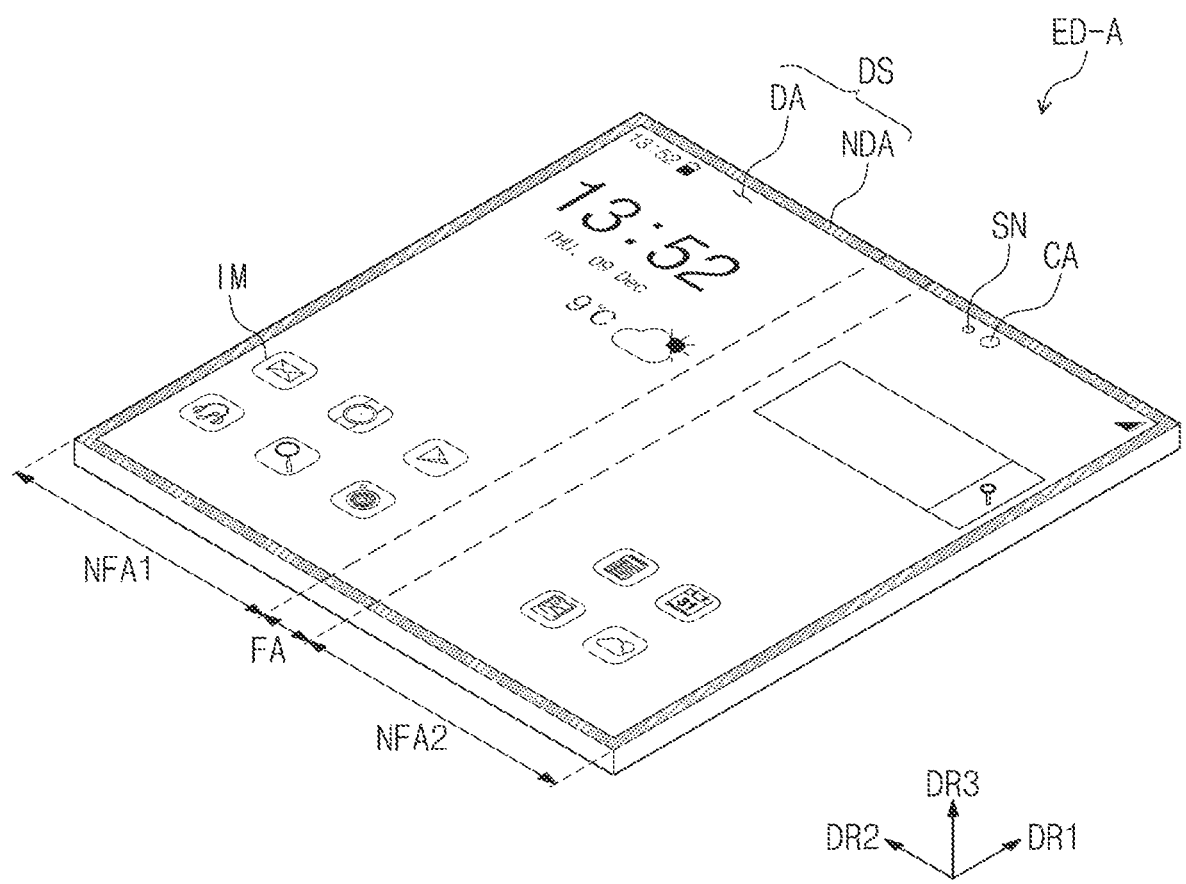
FIG. 3 is a perspective view illustrating an unfolded state of a display device according to an embodiment of the present disclosure.
Figure 4:
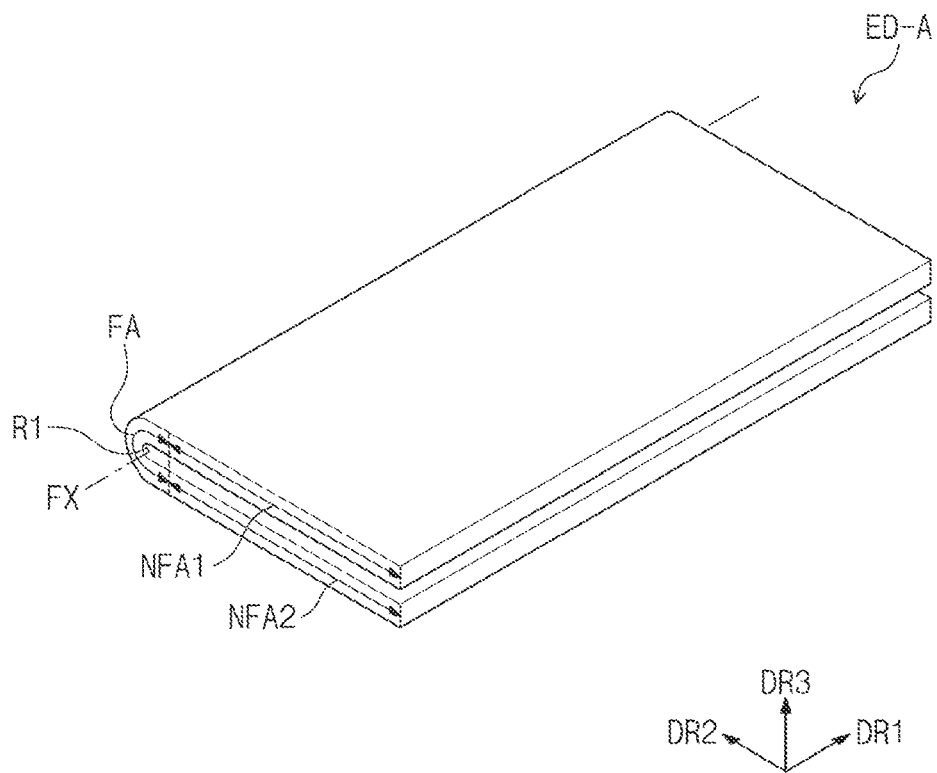
FIG. 4 is a perspective view illustrating a folded state of the display device according to an embodiment of the present disclosure.
Figure 5:
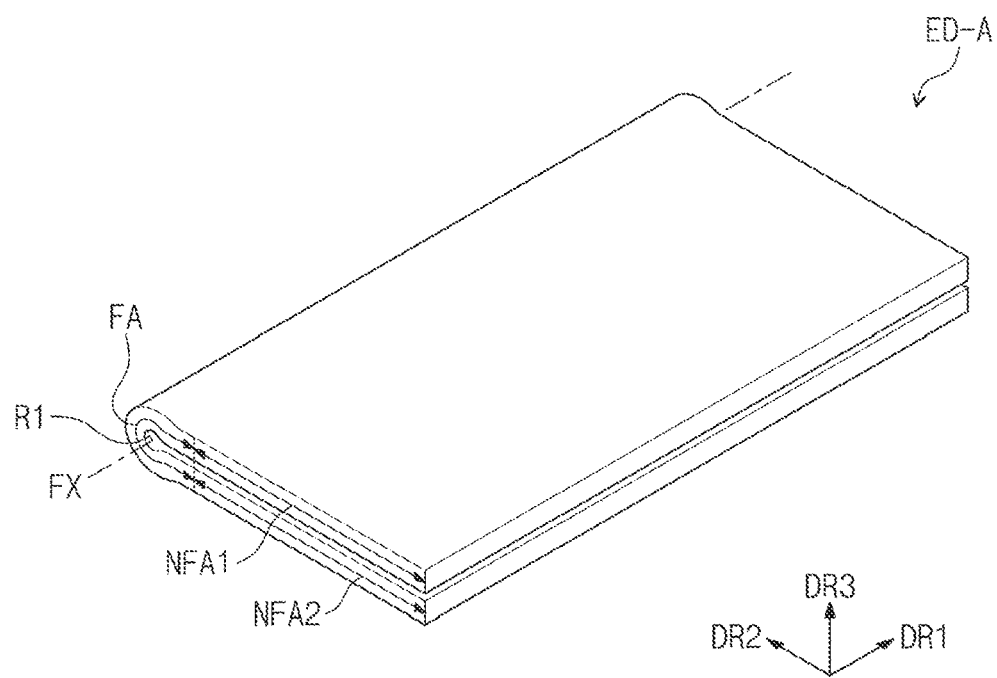
FIG. 5 is a perspective view illustrating a folded state of the display device according to an embodiment of the present disclosure.
Figure 6:
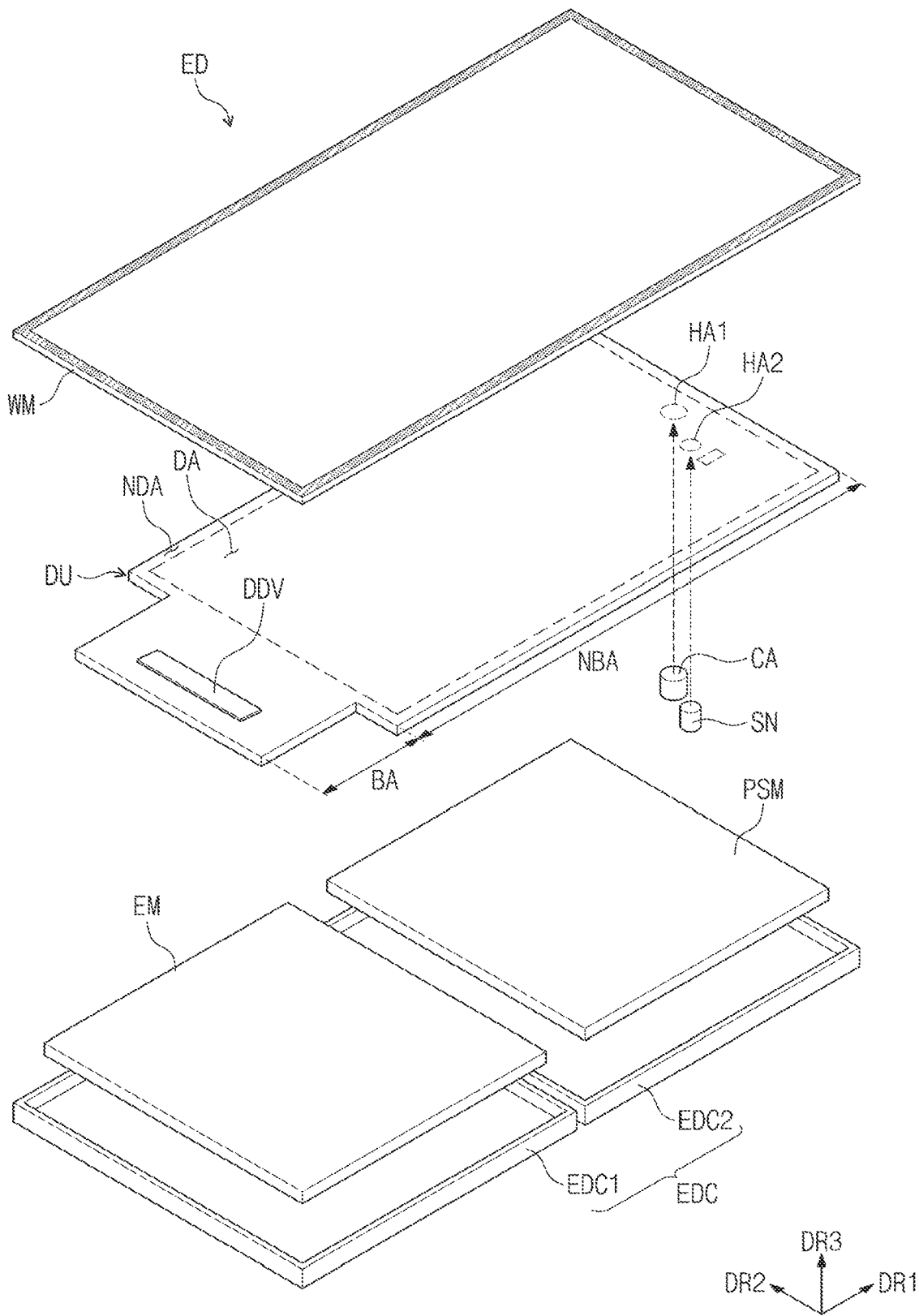
FIG. 6 is an exploded perspective view illustrating the display device according to an embodiment of the present disclosure.

FIG. 1 is a perspective view illustrating an unfolded state of a display device according to an embodiment of the present disclosure. FIG. 2 is a perspective view illustrating a folded state of the display device according to an embodiment of the present disclosure. FIG. 3 is a perspective view illustrating an unfolded state of a display device according to an embodiment of the present disclosure. FIG. 4 is a perspective view illustrating a folded state of the display device according to an embodiment of the present disclosure. FIG. 5 is a perspective view illustrating a folded state of the display device according to an embodiment of the present disclosure. FIG. 6 is an exploded perspective view illustrating the display device according to an embodiment of the present disclosure.

Referring to FIG. 1, a display device ED according to an embodiment of the present disclosure may have a rectangular shape having long sides each extending in a first direction DR1, and short sides each extending in a second direction DR2 crossing the first direction DR1. However, the present disclosure is not limited thereto. For example, the display device ED may have various suitable shapes, such as a circular shape or another polygonal shape. The display device ED may be a flexible display device.

Hereinafter, a direction that crosses a plane defined by the first and second directions DR1 and DR2 in a perpendicular or substantially perpendicular manner is defined as a third direction DR3 (e.g., a thickness direction). As used in the present specification, the expressions "viewed on a plane" and "in a plan view" may be defined as a state when an object, layer, or the like is viewed in (or from) the third direction DR3.

The display device ED may include a folding area FA, and a plurality of non-folding areas NFA1 and NFA2 adjacent to the folding area FA. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged along the first direction DR1.

Although one folding area FA and two non-folding areas NFA1 and NFA2 are illustrated as an example in FIG. 1, the present disclosure is not limited to the number of each of the folding area FA and the non-folding areas NFA1 and NFA2. For example, the display device ED may include three or more non-folding areas and two or more folding areas disposed between the non-folding areas.

A top surface of the display device ED may be defined as a display surface DS, and the display surface DS may have a plane defined by the first direction DR1 and the second direction DR2 in an unfolded state of the display device ED. Images IM generated from the display device ED may be provided to a user through the display surface DS.

The display surface DS may include a display area DA, and a non-display area NDA around (e.g., adjacent to) the display area DA. The display area DA may display an image, and the non-display area NDA may not display an image. The non-display area NDA may define an edge of the display device ED, which may surround (e.g., around a periphery of) the display area DA. For example, the non-display area NDA may be printed in a suitable or desired color (e.g., a predetermined color).

The display device ED may include at least one sensor SN, and at least one camera CA. Each of the sensor SN and the camera CA may be disposed adjacent to an edge of the display device ED. In the present embodiment, the sensor SN and the camera CA may overlap with the display area DA. For example, the sensor SN and the camera CA may be disposed at (e.g., in or on) the display area DA adjacent to the non-display area NDA. Although the sensor SN and the camera CA may be disposed at (e.g., in or on) the first non-folding area NFA1, the present disclosure is not limited thereto. For example, the sensor SN and the camera CA may be disposed at (e.g., in or on) the second non-folding area NFA2.

Light may be transmitted through the display area DA overlapping with the sensor SN and the camera CA of the display surface DS, and the transmitted light may be provided to the sensor SN and the camera CA. For example, the sensor SN may be a proximity sensor. However, the present disclosure is not limited to the kind of the sensor SN provided as an example above. The camera CA may photograph an external image. Each of the sensor SN and the camera CA may be provided in a plurality, in some embodiments.

Referring to FIG. 2, the display device ED may be a folding-type (e.g., a foldable) display device ED that is folded and/or unfolded. For example, the folding area FA of the display device ED may be folded along a folding axis FX extending in the second direction DR2. In the present embodiment, the folding axis FX may be defined as a minor axis that is parallel to or substantially parallel to the short sides of the display device ED. Although the display device ED may be in-folded, the present disclosure is not limited thereto. For example the display device ED may be out-folded.

When the display device ED is folded, the first non-folding area NFA1 and the second non-folding area NFA2 may face each other, and the display device ED may be in-folded, so that the display surface DS is not exposed to the outside. However, the present disclosure is not limited thereto. For example, the display devices ED may be out-folded along the folding axis FX, so that the display surface DS is exposed to the outside.

Referring to FIG. 3, a display device ED-A according to an embodiment of the present disclosure may have a rectangular shape having long sides each extending in a first direction DR1, and short sides each extending in a second direction DR2 crossing the first direction DR1. The display device ED-A may include at least one sensor SN, and at least one camera CA. Although the sensor SN and the camera CA are arranged at (e.g., in or on) a second non-folding area NFA2, the present disclosure is not limited to the arrangement position of each of the sensor SN and the camera CA.

The display device ED-A may include a folding area FA, and a first non-folding area NFA1 and a second non-folding area NFA2, which are adjacent to the folding area FA. The folding area FA may be disposed between the first non-folding area NFA1 and the second non-folding area NFA2. The folding area FA, the first non-folding area NFA1, and the second non-folding area NFA2 may be arranged along the second direction DR2.

Referring to FIG. 4, the display device ED-A according to the present embodiment may be a folding-type (e.g., a foldable) display device ED-A that is folded and/or unfolded. For example, the folding area FA of the display device ED-A may be folded along a folding axis FX extending in the first direction DR1. In the present embodiment, the folding axis FX may be defined as a major axis that is parallel to or substantially parallel to the long sides of the display device ED-A. Although the display device ED-A may be in-folded, the present disclosure is not limited thereto. For example the display device ED-A may be out-folded.

As illustrated in FIG. 4, a distance between the first non-folding area NFA1 and the second non-folding area NFA2 in a third direction DR3 may be equal to or substantially equal to a curvature radius R1. However, the present disclosure is not limited thereto. As illustrated in FIG. 5, a distance between the first non-folding area NFA1 and the second non-folding area NFA2 in the third direction DR3 may be less than the curvature radius R1.

FIG. 6 is an exploded perspective view illustrating the display device ED described above with reference to FIG. 1. The description of the components of the display device ED hereinafter with reference to FIG. 6 may be applied in the same or substantially the same (or similar) manner to the display device ED-A that may be folded along the major axis described above with reference to FIGS. 3 to 5, and thus, redundant description thereof may not be repeated.

Referring to FIG. 6, the display device ED may include a window module (e.g., a window or a window member) WM, a display unit (e.g., a display or a touch-display) DU, a camera CA, a sensor SN, an electronic module (e.g., an electronic device, circuit, or board) EM, a power module (e.g., a power supply) PSM, and a case EDC. Although not separately shown, the display device ED may further include a mechanism structure (e.g., a hinge) for controlling a folding operation of the display unit DU.

The window module WM may provide the display surface DS (e.g., refer to FIG. 1) of the display device ED. The window module WM may be disposed on the display unit DU to protect the display unit DU. Light generated from the display unit DU may be transmitted through the window module WM, and provided to the user.

The display unit DU may include a display panel for generating an image, and a sensor layer for sensing an external input. The display unit DU may include a display area DA and a non-display area NDA, which correspond to the display area DA and the non-display area NDA (e.g., refer to FIG. 1), respectively, of the display device ED. As used in the present specification, the expression "an area or portion corresponds to another area or portion" represents that the area or portion overlaps with another area or portion, and is not limited to the same surface area.

The display panel may be one of a liquid crystal display panel, an electrophoretic display panel, a microelectromechanical system (MEMS) display panel, an electrowetting display panel, an organic light emitting display panel, or an inorganic light emitting display panel. However, the present disclosure is not limited thereto.

The sensor layer may include a plurality of sensing electrodes for sensing an external input through a capacitive method, and sensing insulation layers disposed on the display panel.

In the display unit DU, a first transmission area HA1 and a second transmission area HA2 may be defined. Each of the first transmission area HA1 and the second transmission area HA2 may have a light transmittance greater than that of a surrounding area thereof. The camera CA may be disposed at (e.g., in or below) the first transmission area HA1, and the sensor SN may be disposed at (e.g., in or below) the second transmission area HA2. Light transmitted through the first and second transmission areas HA1 and HA2 may be provided to the camera CA and the sensor SN.

The display unit DU may include a non-bending area NBA including the display area DA and the non-display area NDA adjacent to the display area DA, and a bending area BA including the non-display area NDA.

The display unit DU may include a data driver DDV. The data driver DDV may be manufactured in the form of an integrated circuit (IC) chip, and mounted on the bending area BA. However, the present disclosure is not limited thereto. The data driver DDV may be mounted on a flexible circuit board connected to the display panel.

The mounting of the data driver DDV, or the connecting of the data driver DDV with the flexible circuit board, may be performed at (e.g., in or on) the bending area BA of the display unit DU. The bending area BA of the display unit DU may be bent in a direction toward a rear surface of the display unit DU. Thus, a separate space in the case EDC for securing an area for mounting the data driver DDV, or an area for connecting the data driver DDV with the flexible circuit board, may be reduced.

The electronic module EM and the power module PSM may be disposed below (e.g., underneath) the display unit DU. In some embodiments, the electronic module EM and the power module PSM may be connected through a separate flexible circuit board. The electronic module EM may control an operation of the display device ED. The power module PSM may provide power to the electronic module EM. For example, the power module PSM may include a battery.

The electronic module EM may include a control module (e.g., a controller), a wireless communication module (e.g., a wireless communication circuit), an image input module (e.g., an image input circuit), a sound input module (e.g., a sound input circuit or device), a sound output module (e.g., a sound output circuit or device), a memory, and an external interface module (e.g., an external interface circuit or device). The modules may be mounted to a circuit board, or electrically connected through a flexible circuit board.

The case EDC may accommodate the display unit DU, the electronic module EM, and the power module PSM. The case EDC may be coupled with (e.g., connected to or attached to) the window module WM to define an appearance (e.g., an outer appearance) of the display device ED.

The case EDC may include a first case EDC1 overlapping with the first non-folding area NFA1, and a second case EDC2 overlapping with the second non-folding area NFA2 for convenience of the folding operation of the display unit DU. The case EDC may further include a hinge structure between the first case EDC1 and the second case EDC2.

Figure 7:
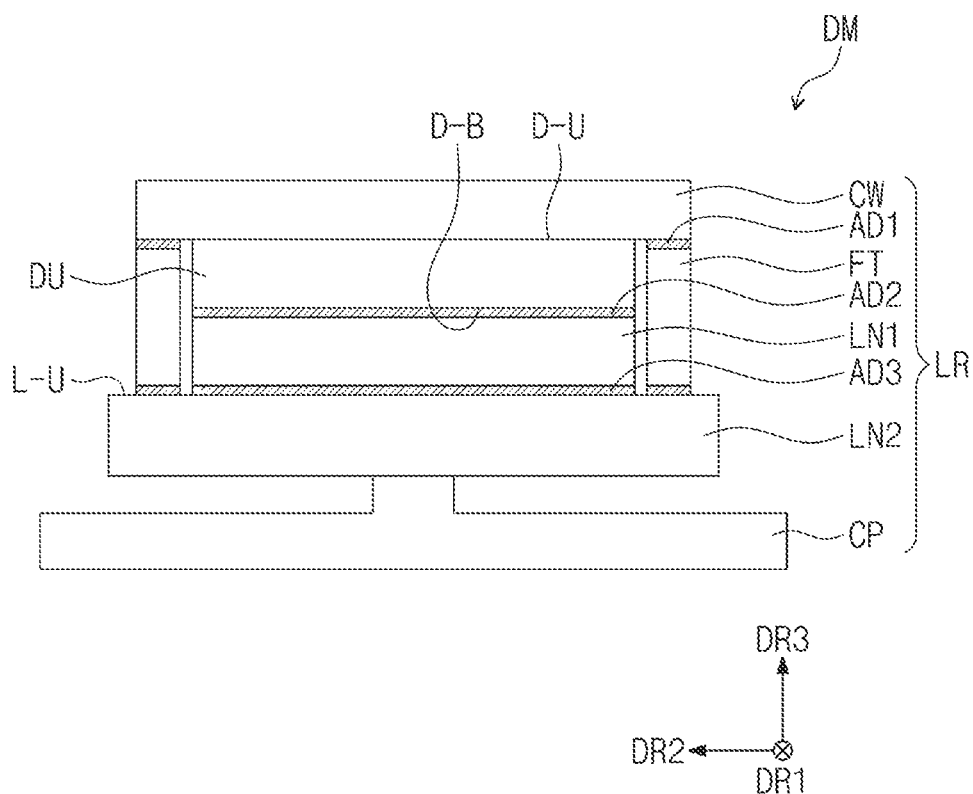
FIG. 7 is a cross-sectional view illustrating a display module according to an embodiment of the present disclosure.
Figure 8A:
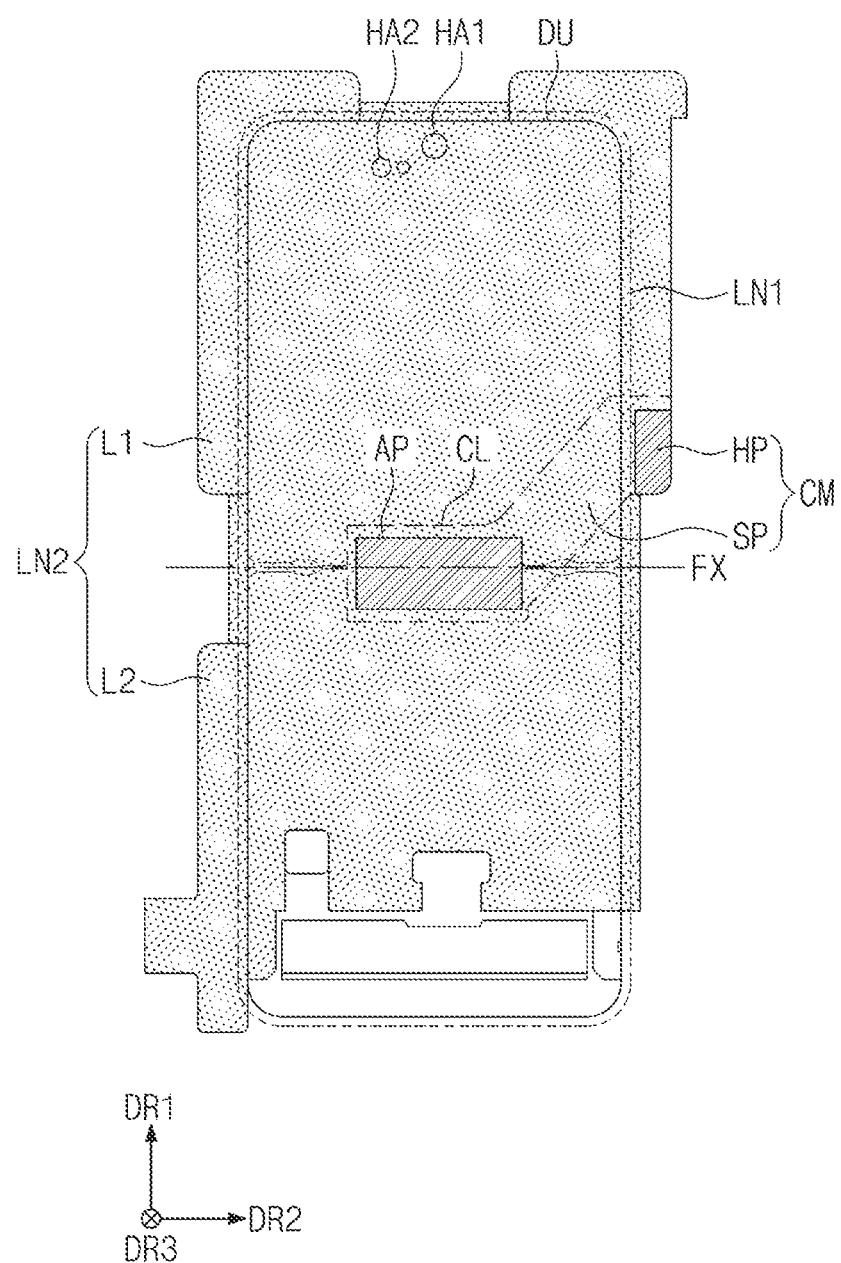
FIG. 8A is a rear view illustrating a display module according to an embodiment of the present disclosure.
Figure 8B:
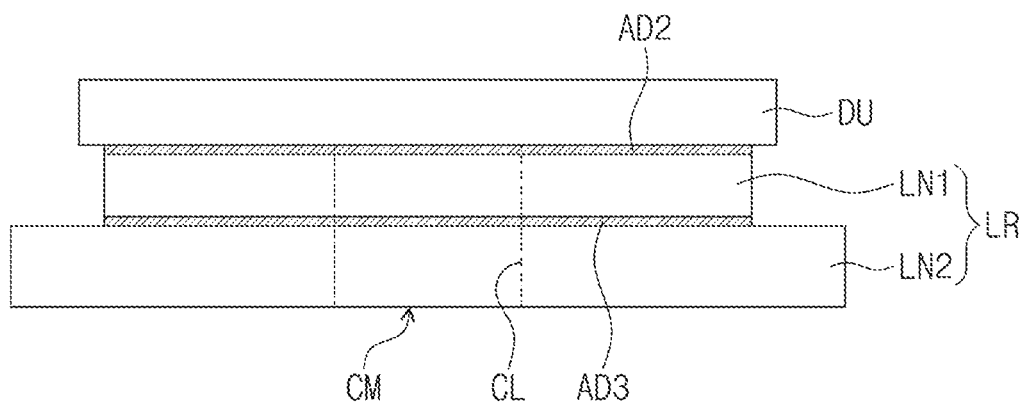
FIG. 8B is a cross-sectional view illustrating a display module according to an embodiment of the present disclosure.
Figure 8C:
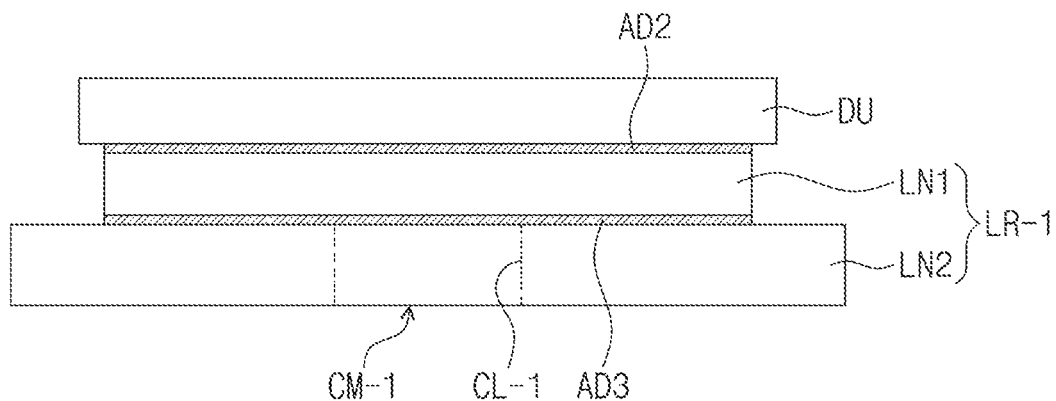
FIG. 8C is a cross-sectional view illustrating a display module according to an embodiment of the present disclosure.
Figure 9:
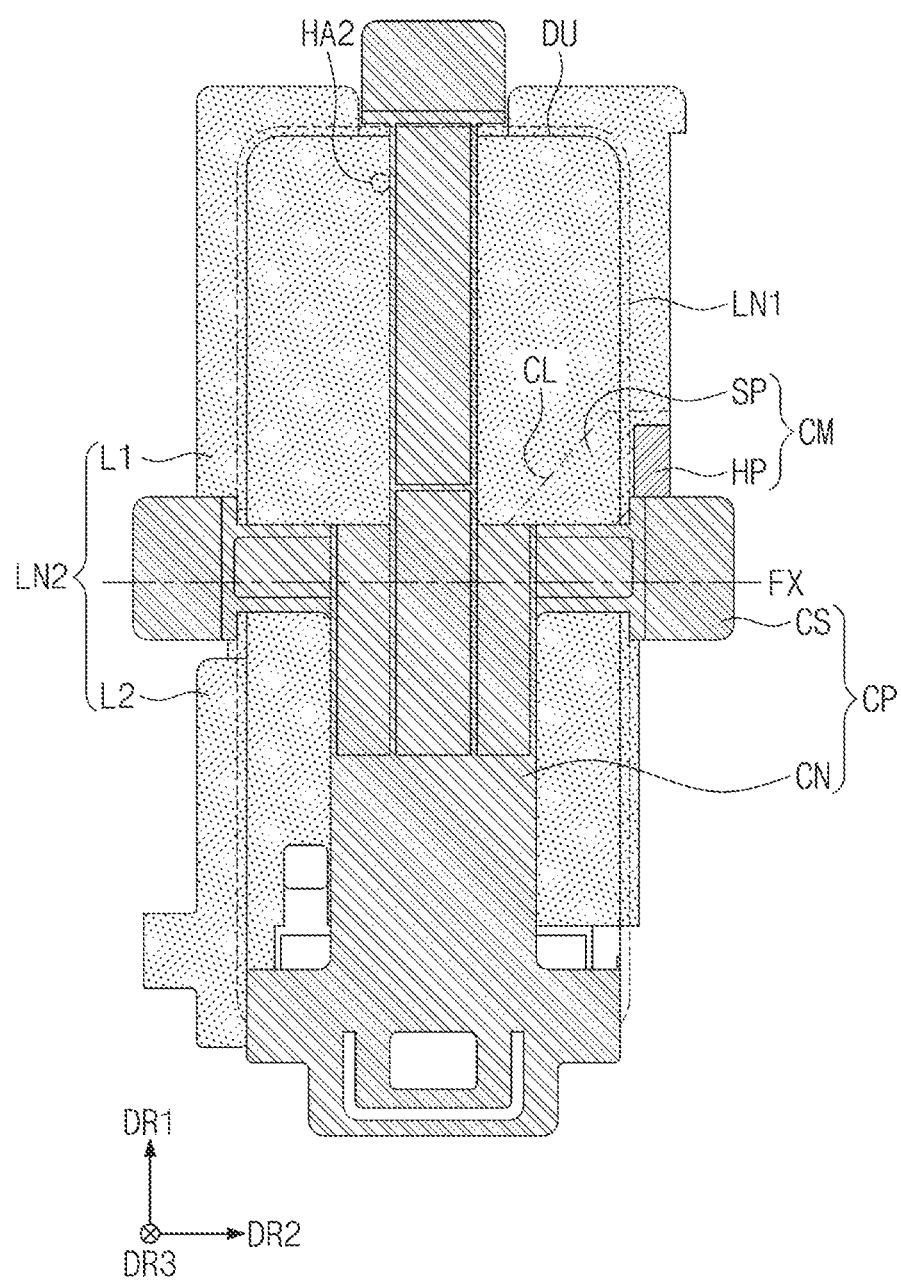
FIG. 9 is a rear view illustrating a display module according to an embodiment of the present disclosure.
Figure 10A:
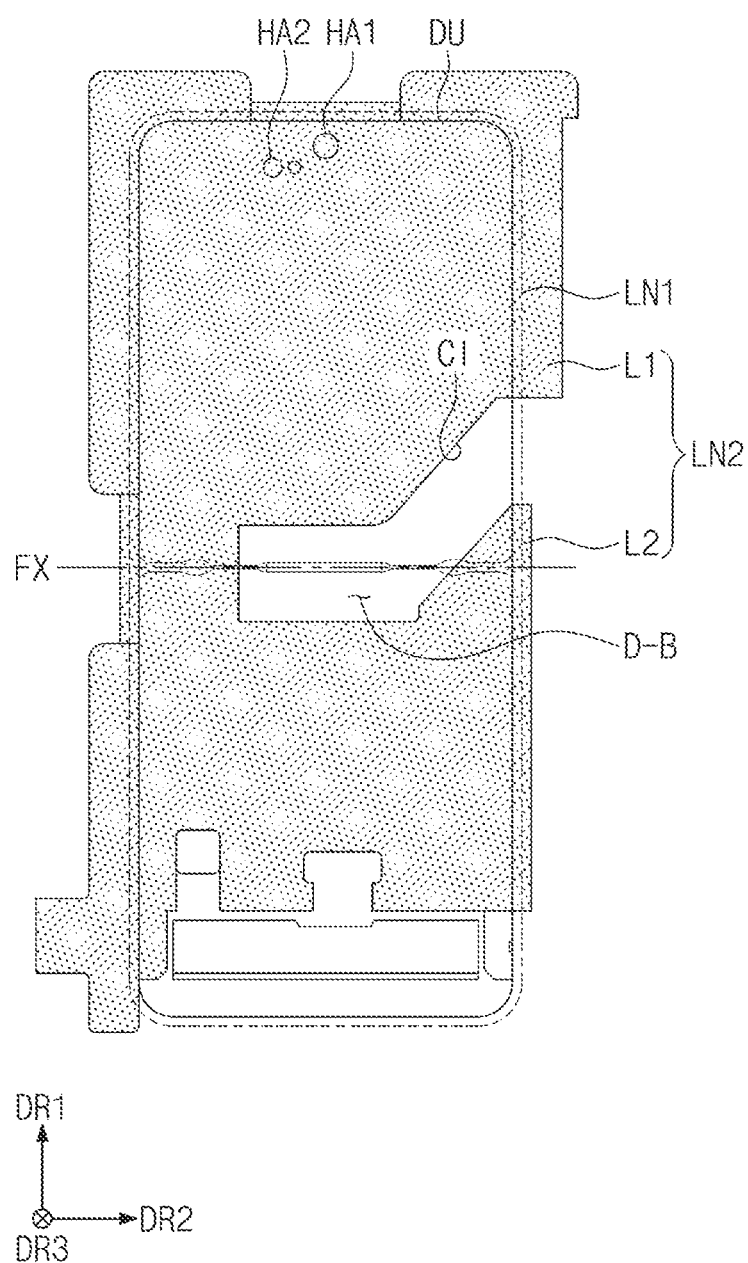
FIG. 10A is a rear view illustrating a display module according to an embodiment of the present disclosure.
Figure 10B:
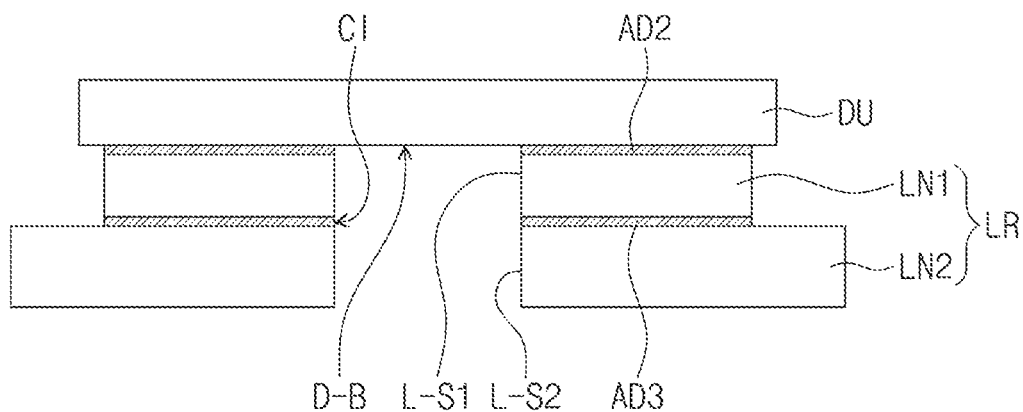
FIG. 10B is a cross-sectional view illustrating a display module according to an embodiment of the present disclosure.
Figure 10C:
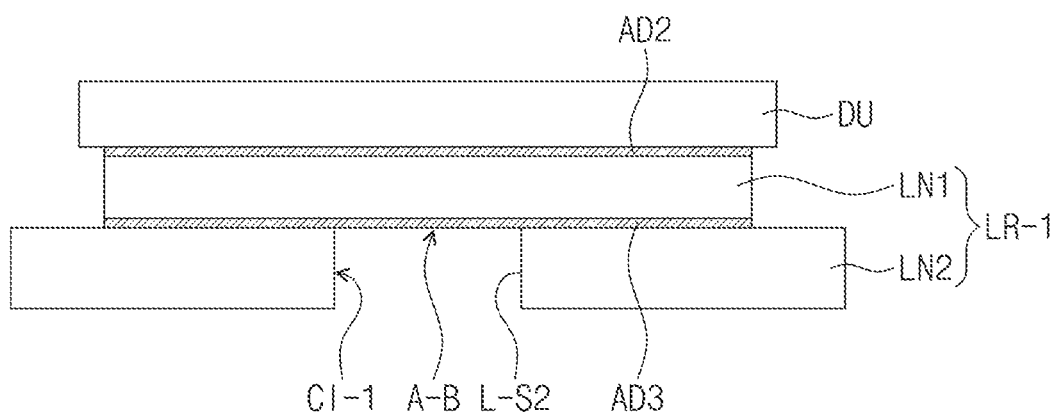
FIG. 10C is a cross-sectional view illustrating a display module according to an embodiment of the present disclosure.
Figure 11:
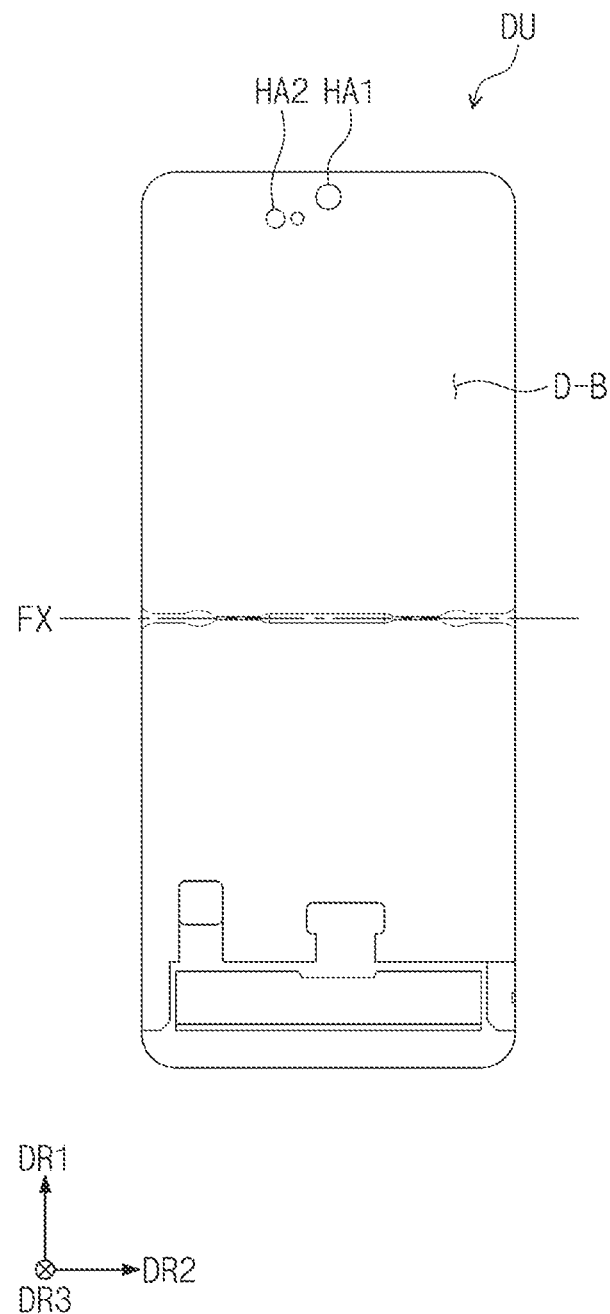
FIG. 11 is a rear view illustrating a display module according to an embodiment of the present disclosure.

FIG. 7 is a cross-sectional view illustrating the display module according to an embodiment of the present disclosure. FIG. 8A is a rear view illustrating the display module according to an embodiment of the present disclosure. FIG. 8B is a cross-sectional view illustrating a display module according to an embodiment of the present disclosure. FIG. 8C is a cross-sectional view illustrating a display module according to an embodiment of the present disclosure. FIG. 9 is a rear view illustrating the display module according to an embodiment of the present disclosure. FIG. 10A is a rear view illustrating the display module according to an embodiment of the present disclosure. FIG. 10B is a cross-sectional view illustrating a display module according to an embodiment of the present disclosure. FIG. 10C is a cross-sectional view illustrating a display module according to an embodiment of the present disclosure. FIG. 11 is a rear view illustrating the display module according to an embodiment of the present disclosure.

FIGS. 7 through 11 illustrate a state in which a cover member for protecting the display unit DU is coupled to (e.g., connected to or attached to) the display unit DU before the display unit DU is coupled with (e.g., connected to or attached to) the electronic module EM, the power module PSM, the case EDC, and the window module WM. The cover member for protecting the display unit DU may be coupled during a process of transferring/transporting/storing the completed display unit DU. Hereinafter, the term "display module" as used in the present specification may be defined as a state in which the display unit DU is coupled with (e.g., connected to or attached to) the cover member.

Referring to FIG. 7, the display module DM according to an embodiment may include the display unit DU, a protection cover CW, and a cover member LR.

The protection cover CW may be disposed on a front surface D-U of the display unit DU. The protection cover CW may be chemically tempered glass.

The cover member LR may include, a first liner LN1, a second liner LN2, a cover pad CP, a tape FT, and adhesive layers AD1, AD2, and AD3.

The tape FT may surround (e.g., around a periphery of) at least a portion of the display unit DU. For example, the tape FT may surround (e.g., around a periphery of) at least two side surfaces from among four side surfaces of the display unit DU, so that the tape FT is disposed adjacent to the at least two side surfaces of the display unit DU. The tape FT may have a thickness in the third direction DR3 greater than that of the display unit DU. The tape FT may be coupled with (e.g., connected to or attached to) a front surface L-U of the second liner LN2. The tape FT may be coupled with (e.g., connected to or attached to) the second liner LN2 through a first adhesive layer AD1. The first adhesive layer AD1 may be disposed on each of a front surface and a rear surface of the tape FT.

The first liner LN1 may be disposed on a rear surface D-B of the display unit DU. The first liner LN1 may compensate for a stepped portion generated by the tape FT having a thickness greater than that of the display unit DU, when the tape FT is coupled with (e.g., connected to or attached to) the second liner LN2. In the present embodiment, the first liner LN1 may have a thickness of about 20 μm or more and about 200 μm or less.

The first liner LN1 may be coupled to (e.g., connected to or attached to) the rear surface D-B of the display unit DU through a second adhesive layer AD2. The second adhesive layer AD2 may be disposed on a front surface of the first liner LN1.

The second liner LN2 may be disposed on a rear surface of the first liner LN1. The second liner LN2 may have an area greater than that of the first liner LN1. The tape FT may be coupled to (e.g., connected to or attached to) a portion of the front surface L-U of the second liner LN2 protruding further than an end of the first liner LN1 on a plane (e.g., in a plan view). In the present embodiment, the second liner LN2 may have a thickness of about 50 μm or more and about 100 μm or less.

The second liner LN2 may be coupled to (e.g., connected to or attached to) the rear surface of the first liner LN1 through a third adhesive layer AD3. The third adhesive layer AD3 may be disposed on the front surface L-U of the second liner LN2.

In the present embodiment, a release treatment may be performed on the front surface L-U of the second liner LN2. Thus, when the protection cover CW is removed from the display module DM, the first adhesive layer AD1 may be separated from the front surface L-U of the second liner LN2 in a state in which the tape FT is coupled with (e.g., connected to or attached to) the protection cover CW. Thus, an adhesive force of the first adhesive layer AD1 to the second liner LN2 may be less than an adhesive force of the first adhesive layer AD1 to each of the tape FT and the protection cover CW.

The cover pad CP may be disposed below (e.g., underneath) the second liner LN2. The cover pad CP may be coupled with (e.g., connected to or attached to) the second liner LN2 by an adhesive part AP (e.g., refer to FIG. 8A) disposed on a rear surface of the second liner LN2. The cover pad CP may be a component that is held or substantially held when the display module DM is transferred.

FIGS. 8A through 11 illustrate various processes of removing the cover member LR from the display unit DU. The protection cover CW and the tape FT are removed from the second liner LN2, and the other components of the cover member LR are illustrated. In FIGS. 8A, 9, and 10A, the first liner LN1 is illustrated by a dotted line.

Referring to FIGS. 8A and 8B, the cover member LR according to an embodiment may include the first liner LN1, the second liner LN2, and a cutting part CM. The cutting part CM may include a removal part SP and a handle part HP.

As illustrated in FIG. 8B, the cutting part CM may be defined by a cutting line CL including points passing through the second liner LN2, the third adhesive layer AD3, the first liner LN1, and the second adhesive layer AD2. According to the present embodiment, the cutting part CM may overlap with a portion of the folding area FX of the display unit DU. The cutting part CM may overlap with a portion of each of the second liner LN2, the third adhesive layer AD3, the first liner LN1, and the second adhesive layer AD2, which overlaps with the folding axis FX. The second liner LN2 may include a first portion L1 and a second portion L2. The first portion L1 may overlap with the first non-folding area NFA1, and the second portion L2 may overlap with the second non-folding area NFA2 (e.g., see FIG. 1)

The second portion L2 may expose the bending area BA (e.g., refer to FIG. 6) of the display unit DU. For example, the bending area BA of the display unit DU may be spaced apart from the second portion L2 in a state in which the bending area BA of the display unit DU is bent in a direction toward the rear surface of the display unit DU.

The cutting part CM may overlap with the first portion L1 and the second portion L2, which are adjacent to the folding axis FX, and may extend from the inside of (e.g., within) the first portion L1 overlapping with the display unit DU in a right diagonal direction to the outside of the first portion L1 spaced apart from the display unit DU. However, the present disclosure is not limited to the extension direction of the cutting part CM. For example, the cutting part may extend from the inside of (e.g., within) the first portion L1 overlapping with the display unit DU in a left diagonal direction of the first portion L1, or may extend from the inside of (e.g., within) the first portion L1 overlapping with the display unit DU in the left and right diagonal directions of the second portion L2.

According to an embodiment, the first portion L1 and the second portion L2 of the second liner LN2 may be connected and integrated with each other. The cutting part CM may overlap with a partial area of the folding axis FX, and may not be provided at left and right ends of the second liner LN2 overlapping with the folding axis FX. Thus, the first portion L1 and the second portion L2 may be connected and integrated with each other with the cutting part CM therebetween.

The above-described structure may be applied to even the first liner LN1. A first portion and a second portion, which respectively overlap with the first portion L1 and the second portion L2 of the second liner LN2, may be defined in the first liner LN1. The first portion and the second portion of the first liner LN1 may be connected and integrated with each other with the cutting part CM therebetween. Also, the above-described structure may be applied to the third adhesive layer AD3 and the second adhesive layer AD2 in the same or substantially the same manner.

According to an embodiment of the present disclosure, as the first and second liners LN1 and LN2 and the second and third adhesive layers AD2 and AD3 are connected and integrated with each other with the cutting part CM therebetween, the folding area FA of the display unit DU may be supported by a suitable portion (e.g., a predetermined portion) of the cover member LR, event though the cutting part CM is removed from the cover member LR. Thus, an impact applied to the folding area FA may be reduced, foreign substances may be prevented or substantially prevented from being introduced to the folding area FA, and deformation of the display unit DU may be minimized or reduced.

The cutting part CM may further include the handle part HP. The handle part HP may not overlap with the display unit DU, and may be disposed at (e.g., in or on) the same layer as that of the second liner LN2. The user may hold the handle part HP to remove the cutting part CM along the cutting line CL.

The cutting part CM may further include an adhesive part AP. The cover pad CP (e.g., see FIG. 7) may be coupled to (e.g., connected to or attached to) the cutting part CM through the adhesive part AP. A surface to which the adhesive part AP is attached in the cutting part CM may be or substantially may be the rear surface of the second liner LN2.

Referring to FIG. 8C, a cover member LR-1 according to an embodiment may include a first liner LN1, a second adhesive layer AD2, a second liner LN2, a third adhesive layer AD3, and a cutting part CM-1. In the present embodiment, the cutting part CM-1 may be defined by a cutting line CL-1 including points passing through the second liner LN2 and the third adhesive layer AD3, but unlike the embodiment shown in FIG. 8B, the cutting line CL-1 may not pass through the first liner LN1 and the second adhesive layer AD2.

Referring to FIG. 9, the cover pad CP may be coupled with (e.g., connected to or attached to) the cutting part CM by the adhesive part AP. As a surface to which the adhesive part AP is attached corresponds to the rear surface of the second liner LN2, the cover pad CP may be coupled with (e.g., connected to or attached to) the second liner LN2.

The cover pad CP may include a support part CN and a holding part CS. The support part CN may overlap with the display unit DU, and the holding part CS may extend from the support part CN to protrude from outer side surfaces of the display unit DU. The user may easily transfer the display module DM through the holding part CS of the cover pad CP.

Referring to FIGS. 10A and 10B, the cutting part CM and the cover pad CP may be removed from the display module DM. Here, the cutting part CM and the cover pad CP may be removed concurrently (e.g., at the same or substantially the same time) with each other. In other words, when the user removes the cutting part CM along the cutting line CL (e.g., refer to FIG. 9) through the handle part HP, the cover pad CP coupled with (e.g., connected to or attached to) the adhesive part AP may be removed together with the cutting part CM from the display module DM. Here, when the cutting part CM is removed, a removal hole CI may be defined in the cover member LR. A portion of the rear surface D-B of the display unit DU overlapping with the cutting part CM may be exposed from the removal hole CI.

As illustrated in FIG. 10B, in the present embodiment, the cutting line CL (e.g., refer to FIG. 9) of the cutting part CM (e.g., refer to FIG. 8B) may include points passing through the first liner LN1, the second adhesive layer AD2, the second liner LN2, and the third adhesive layer AD3. Thus, when the cutting part CM is removed, a portion overlapping with the cutting part CM of each of the first liner LN1, the second adhesive layer AD2, the second liner LN2, and the third adhesive layer AD3 may be removed. Thus, the removal hole CI may be defined by a side surface (e.g., an inner side surface) of each of the second adhesive layer AD2 and the third adhesive layer AD3, a side surface (e.g., an inner side surface) L-S1 of the first liner LN1, and a side surface (e.g., an inner side surface) L-S2 of the second liner LN2.

According to the present embodiment, an adhesive force of the second adhesive layer AD2 to the first liner LN1 may be greater than an adhesive force of the second adhesive layer AD2 to the rear surface D-B of the display unit DU. Also, an adhesive force of the third adhesive layer AD3 to each of the first liner LN1 and the second liner LN2 may be equal to or greater than the adhesive force of the second adhesive layer AD2 to the first liner LN1.

According to an embodiment of the present disclosure, the second adhesive layer AD2 may include urethane, and the third adhesive layer AD3 may include silicon. However, the present disclosure is not limited thereto. For example, each of the second adhesive layer AD2 and the third adhesive layer AD3 may include various kinds of suitable materials, as long as the materials maintain or substantially maintain a suitable relative adhesive force.

Thus, the first liner LN1, the second adhesive layer AD2, the second liner LN2, and the third adhesive layer AD3 contained in the cutting part CM may be easily removed from the rear surface D-B of the display unit DU, instead of being separated from one another.

As illustrated in the embodiment of FIG. 10C, the cutting line CL-1 of the cutting part CM-1 (e.g., refer to FIG. 8C) may include points passing through the second liner LN2. Thus, when the cutting part CM-1 is removed from the cover member LR-1, a portion of the second liner LN2 overlapping with the cutting part CM-1 may be removed. Accordingly, the removal hole CI-1 may be defined by the side surface L-S2 of the second liner LN2.

Referring to FIG. 11, the display device ED (e.g., refer to FIG. 1) may be manufactured by coupling (e.g., connecting or attaching) components to the display unit DU, and/or by removing the cover member LR in which the cutting part CM is removed from the display unit DU, to test whether or not the display unit DU operates properly.

As the cover member LR according to one or more embodiments of the present disclosure includes the cutting part CM coupled with (e.g., connected to or attached to) the cover pad CP, which are removed from the cover member LR, costs for manufacturing the cover member LR may be reduced by omitting an additional liner that may be disposed between the second liner LN2 and the cover pad CP to couple the cover pad CP, and deformation of the display unit DU may be minimized or reduced by providing the cutting part CM to only a portion of the folding axis FX.

Figure 12:
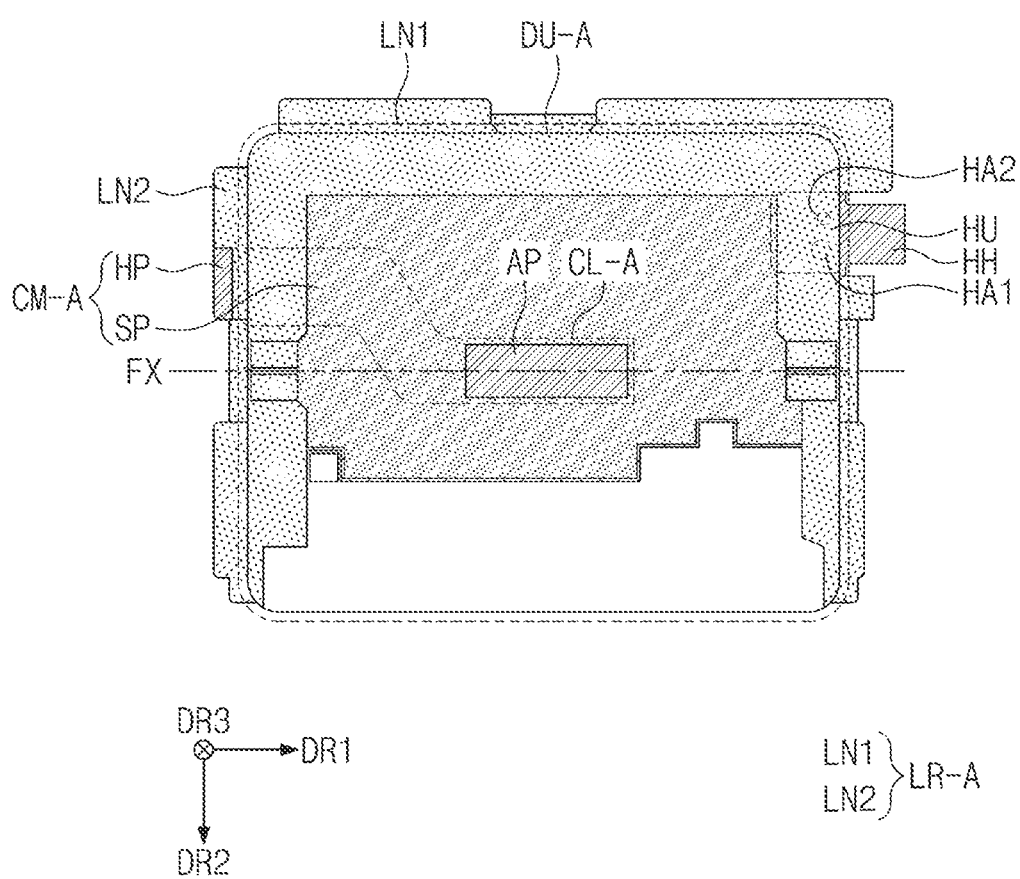
FIG. 12 is a rear view illustrating a display module according to an embodiment of the present disclosure.
Figure 13:
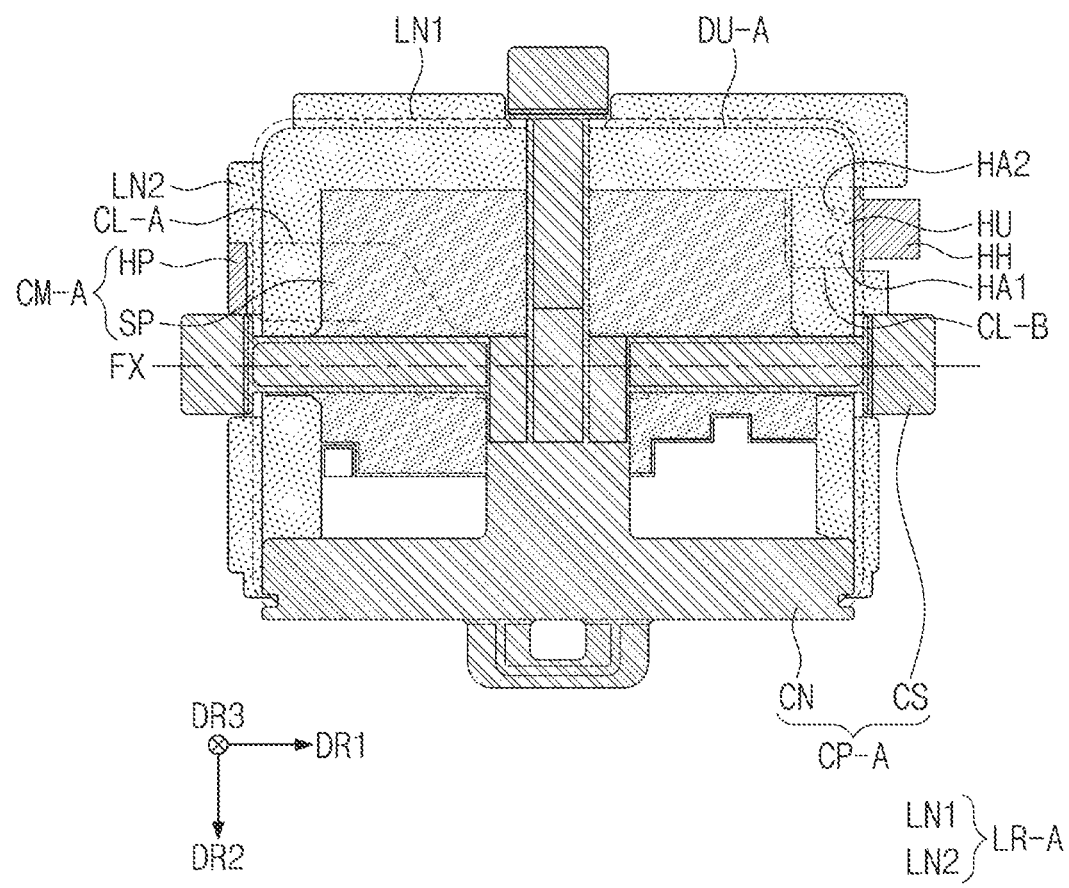
FIG. 13 is a rear view illustrating a display module according to an embodiment of the present disclosure.
Figure 14:
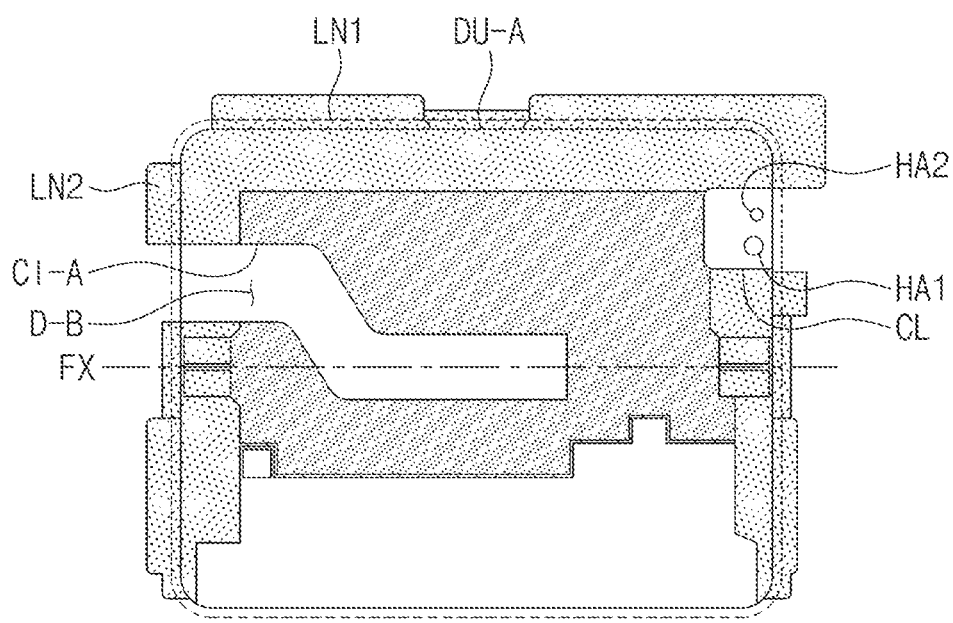
FIG. 14 is a rear view illustrating a display module according to an embodiment of the present disclosure.
Figure 14:
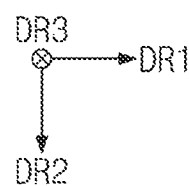
Figure 15:
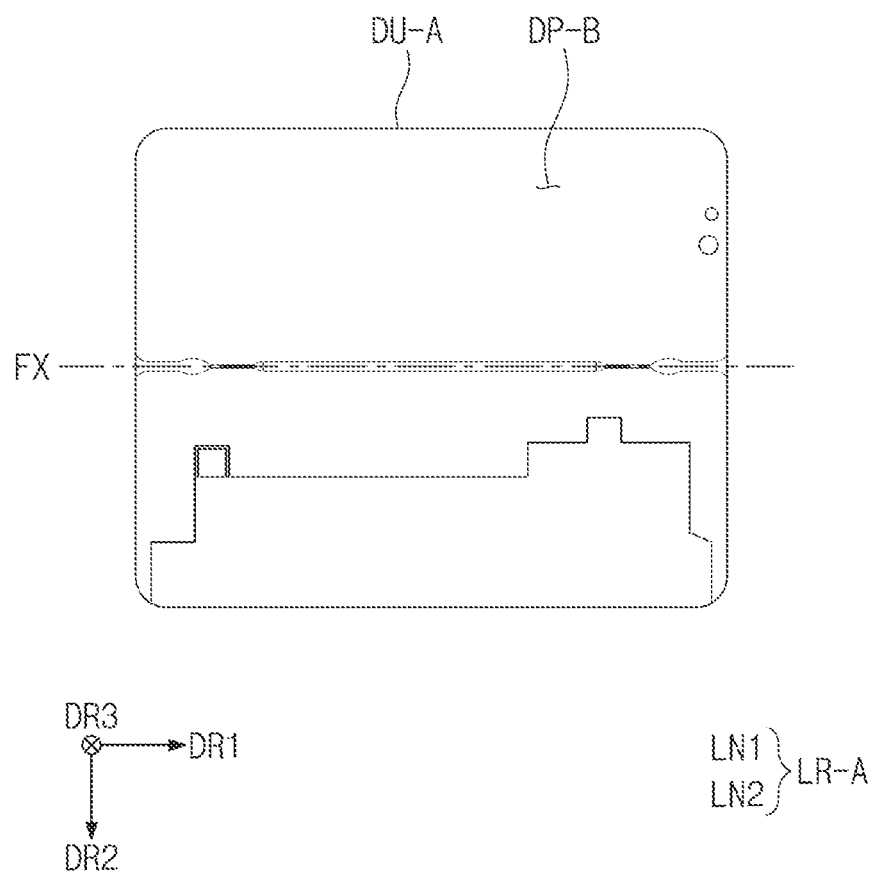
FIG. 15 is a rear view illustrating a display module according to an embodiment of the present disclosure.

FIG. 12 is a rear view illustrating a display module according to an embodiment of the present disclosure. FIG. 13 is a rear view illustrating a display module according to an embodiment of the present disclosure. FIG. 14 is a rear view illustrating a display module according to an embodiment of the present disclosure. FIG. 15 is a rear view illustrating a display module according to an embodiment of the present disclosure. In FIGS. 12 through 15, the same or substantially the same (or similar) components as those described above with reference to FIGS. 1 through 11 are designated by the same or similar reference symbols, and thus, redundant description thereof may not be repeated.

FIGS. 12 through 15 illustrate a state in which a cover member for protecting a display unit (e.g., a display or a touch-display) DU-A is coupled to (e.g., connected to or attached to) the display unit DU-A, before the display unit DU-A described above with reference to FIGS. 3 and 6 is coupled with (e.g., connected to or attached to) an electronic module (e.g., an electronic device, circuit, or board) EM-A, a power module (e.g., a power supply) PSM, a case EDC, and a window module (e.g., a window or a window member) WM. The cover member for protecting the display unit DU-A may be coupled (e.g., connected or attached) during a process of transferring/transporting/storing the completed display unit DU-A. Hereinafter, the term "display module" may be defined as a state in which the display unit DU-A is coupled with (e.g., connected to or attached to) the cover member. A cross-sectional view of the display module described in more detail below with reference to FIGS. 12 through 15 may be the same or substantially the same as that shown in FIG. 7, and thus, redundant description thereof may not be repeated.

FIGS. 12 through 15 illustrate various processes of removing a cover member LR-A from the display unit DU-A. The protection cover CW and the tape FT described above with reference to FIG. 7 are removed from the second liner LN2, and the rest of the other components of the cover member LR-A are illustrated. In FIGS. 12 through 14, the first liner LN1 (e.g., refer to FIG. 7) is illustrated by a dotted line.

Referring to FIG. 12, the cover member LR-A according to an embodiment may include the first liner LN1, a second liner LN2, and a cutting part CM-A. The cutting part CM-A may include a removal part SP and a handle part HP. In the present embodiment, the cover member LR-A may further include an additional handle part HH and an additional cutting part HU.

The cutting part CM-A may be defined by a cutting line CL-A including points passing through the second liner LN2, the third adhesive layer AD3, the first liner LN1, and the second adhesive layer AD2, which are described above with reference to FIG. 8B.

The cutting part CM-A may overlap with a portion of each of the second liner LN2, the third adhesive layer AD3, the first liner LN1, and the second adhesive layer AD2, which overlaps with the folding axis FX. Thus, in the cover member LR-A according to the present embodiment, the first and second liners LN1 and LN2 and the second and third adhesive layers AD2 and AD3 may be connected and integrated with each other, even though the cutting part CM-A is removed.

The cutting part CM-A may further include the handle part HP. The handle part HP may not overlap with the display unit DU-A, and may be disposed at (e.g., in or on) the same layer as that of the second liner LN2. The user may hold the handle part HP to remove the cutting part CM-A along the cutting line CL-A.

The cutting part CM-A may further include an adhesive part AP. The cover pad CP-A may be coupled to (e.g., connected to or attached to) the cutting part CM-A through the adhesive part AP. A surface to which the adhesive part AP is attached in the cutting part CM-A may be or substantially may be a rear surface of the second liner LN2.

The additional cutting part HU may overlap with a first transmission area HA1 and a second transmission area HA2, and may be provided in the same or substantially the same manner as that of the cutting part CM-A. In other words, the additional cutting part HU may be defined by points passing through the second liner LN2, the third adhesive layer AD3, the first liner LN1, and the second adhesive layer AD2, which are described above with reference to FIG. 8B.

The additional handle part HH may extend from the additional cutting part HU, and may be disposed at (e.g., in or on) the same layer as that of the second liner LN2. The user may hold the additional handle part HH to remove the additional cutting part HU.

Referring to FIG. 13, the cover pad CP-A may be coupled with (e.g., connected to or attached to) the cutting part CM-A by the adhesive part AP. As a surface to which the adhesive part AP is attached corresponds to the rear surface of the second liner LN2, the cover pad CP-A may be coupled with (e.g., connected to or attached to) the second liner LN2.

The cover pad CP-A may include a support part CN and a holding part CS. The support part CN may overlap with the display unit DU-A, and the holding part CS may extend from the support part CN to protrude from outer side surfaces of the display unit DU-A. The user may easily transfer the display module through the holding part CS of the cover pad CP-A.

Referring to FIG. 14, the cutting part CM-A and the cover pad CP-A may be removed from the display module. Here, the cutting part CM-A and the cover pad CP-A may be removed concurrently (e.g., at the same or substantially the same time) with each other. In other words, when the user removes the cutting part CM-A along the cutting line CL-A through the handle part HP, the cover pad CP-A coupled with (e.g., connected to or attached to) the adhesive part AP may be removed together with the cutting part CM-A from the display module. Here, when the cutting part CM-A is removed, a removal hole CI-A may be defined in the cover member LR-A. A portion of a rear surface D-B of the display unit DU-A overlapping with the cutting part CM-A may be exposed from the removal hole CI-A.

According to the present embodiment, the additional cutting part HU may be removed through the additional handle part HH. Thus, the first transmission area HA1 and the second transmission area HA2 may be exposed to the outside.

Referring to FIG. 15, the display device ED-A (e.g., refer to FIG. 3) may be manufactured by coupling (e.g., connecting or attaching) components to the display unit DU-A, and/or by removing the cover member LR-A in which the cutting part CM-A is removed from the display unit DU-A, to test whether or not the display unit DU-A operates properly.

According to one or more embodiments of the present disclosure, as the cover member includes the cutting part that is coupled with (e.g., connected to or attached to) the cover pad and separable from the cover member, the additional liner that may be disposed between the cover member and the cover pad to couple the cover pad may be omitted. Thus, costs for manufacturing the cover member may be reduced.

According to one or more embodiments of the present disclosure, as the cutting part is provided to the cover member at only a portion of the folding axis, deformation of the display unit may be minimized or reduced.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display module comprising:
   a display unit configured to be folded along a virtual folding axis, and including:
      a front surface; and
      a rear surface opposite to the front surface;
   a protection cover on the front surface of the display unit;
   a cover member on the rear surface of the display unit, and comprising a cutting part configured to be separable from the cover member and overlapping with a portion of the folding axis; and
   a cover pad below the cover member.

2. The display module of claim 1, wherein the cover member comprises:
   a first liner adjacent to the display unit;
   a first adhesive layer between the display unit and the first liner;
   a second liner comprising an adhesive part adjacent to the cover pad, and overlapping with the cutting part; and
   a second adhesive layer between the first liner and the second liner, and
   wherein the cover pad is coupled with the cutting part by the adhesive part.

3. The display module of claim 1, wherein the display unit comprises:
   a folding area overlapping with the folding axis; and
   first and second non-folding areas spaced from each other with the folding area therebetween, and
   wherein the cover member comprises:
      a first portion overlapping with a portion of the folding area and the first non-folding area; and
      a second portion overlapping with a remaining portion of the folding area and the second non-folding area.

4. The display module of claim 3, wherein the first portion and the second portion are connected to each other with the cutting part therebetween in the folding area.

5. The display module of claim 2, wherein the first adhesive layer comprises urethane, and the second adhesive layer comprises silicon.

6. The display module of claim 2, wherein, when the cutting part is separated from the cover member, the cover pad is separated together with the cutting part from the cover member.

7. The display module of claim 6, wherein, when the cutting part is separated from the cover member, a portion of the rear surface of the display unit or a portion of a rear surface of the first liner is exposed.

8. The display module of claim 2, wherein the first liner is located on a front surface of the second liner, and a portion of the front surface of the second liner is configured to receive a release treatment to separate the protection cover from the display unit.

9. The display module of claim 8, further comprising a tape that surrounds at least a portion of the display unit, and couples the protection cover to the front surface of the second liner.

10. The display module of claim 2, wherein the cutting part further comprises a handle part that does not overlap with the display unit in a plan view, and is located at the same layer as that of the second liner.

11. The display module of claim 2, wherein:
the first liner has a thickness of about 20 μm or more, and about 200 μm or less; and
the second liner has a thickness of about 50 μm or more, and about 100 μm or less.

12. The display module of claim 1, wherein, when the cutting part is separated from the cover member, a portion of the rear surface of the display unit overlapping with the folding axis with the cutting part therebetween is covered by the cover member, and a portion of the rear surface of the cover member overlapping with the cutting part is exposed.

13. The display module of claim 1, wherein the display unit comprises:
a bending part configured to be bent in a direction toward the rear surface of the display unit; and
a non-bending part adjacent to the bending part, and overlapping with the folding axis, and
wherein the bending part is exposed from the cover member.

14. A display module comprising:
a display unit configured to be folded along a virtual folding axis, and including:
a front surface; and
a rear surface opposite to the front surface;
a protection cover on the front surface of the display unit;
a cover member comprising:
a first liner on the rear surface of the display unit; and
a second liner below the first liner; and
a cover pad below the second liner,
wherein the cover member further comprises a cutting line passing through the first liner and the second liner, and overlapping with a portion of the folding axis.

15. The display module of claim 14, wherein the cover member comprises an adhesive part on a rear surface of the second liner, at least a portion of the adhesive part being surrounded by the cutting line, and
wherein the cover pad is coupled with the second liner by the adhesive part.

16. The display module of claim 14, wherein, when the first liner and the second liner are removed along the cutting line, a portion of the rear surface of the display unit is exposed.

17. The display module of claim 14, wherein the first liner is located on a front surface of the second liner, and a portion of the front surface of the second liner is configured to receive a release treatment to separate the protection cover from the display unit.

18. The display module of claim 17, further comprising a tape that surrounds at least a portion of the display unit, and couples the protection cover to the front surface of the second liner.

19. The display module of claim 14, wherein the display unit comprises:
a bending part configured to be bent in a direction toward the rear surface of the display unit; and
a non-bending part adjacent to the bending part, and overlapping with the folding axis, and
wherein the bending part is exposed from the cover member.

20. The display module of claim 14, wherein at least one of the first liner or the second liner comprises:
a first portion overlapping with one side of the display unit; and
a second portion overlapping with another side of the display unit based on the folding axis, and
wherein the first portion and the second portion are connected to each other.

* * * * *